(12) United States Patent
Hsi-Chun

(10) Patent No.: US 6,916,002 B2
(45) Date of Patent: Jul. 12, 2005

(54) STRUCTURAL IMPROVEMENT OF MEMBRANE VALVE

(75) Inventor: Chung Hsi-Chun, Lu Chou (TW)

(73) Assignee: BAG Filter Enterprise Co., Ltd., Taipei Hsien (TW)

( * ) Notice: Subject to any disclaimer, the term of this patent is extended or adjusted under 35 U.S.C. 154(b) by 187 days.

(21) Appl. No.: 10/379,534

(22) Filed: Mar. 6, 2003

(65) Prior Publication Data

US 2004/0173765 A1 Sep. 9, 2004

(51) Int. Cl.[7] .............................................. F16K 31/40
(52) U.S. Cl. ................................... 251/30.02; 137/489
(58) Field of Search .......................... 251/30.01, 30.02, 251/30.03, 30.05, 28, 29; 137/487.5, 488, 489

(56) References Cited

U.S. PATENT DOCUMENTS

| 2,407,761 | A | * | 9/1946 | McPherson | 251/30.02 |
| 2,566,019 | A | * | 8/1951 | Dempsey | 251/30.02 |
| 2,572,175 | A | * | 10/1951 | McPherson | 251/30.05 |
| 2,977,966 | A | * | 4/1961 | Matthews | 137/489 |
| 3,036,778 | A | * | 5/1962 | Dillman | 137/489 |
| 5,118,072 | A | * | 6/1992 | Sakamoto et al. | 251/30.02 |
| 5,520,366 | A | * | 5/1996 | Elliott | 251/30.01 |
| 6,354,562 | B1 | * | 3/2002 | Fukano et al. | 251/30.03 |

FOREIGN PATENT DOCUMENTS

EP       1085244 A2 *  3/2001  ........... F16K/31/40

* cited by examiner

*Primary Examiner*—Eric Keasel
(74) *Attorney, Agent, or Firm*—Troxell Law Office, PLLC

(57) ABSTRACT

The membrane valve body includes at least two layers of chambers which is configured in the valve body, and at the interior of each said chamber a duct is mounted, out of which covered with the bigger air coupling. A membrane is arranged to separate the chamber from the duct, furthermore, the membrane acts as a valve gate controlling the communication between the duct and the air coupling, in which: a connection air tube is configured at the air couplings directly between the upper and lower chamber. The upper membrane is entirely sealed, when the magnetic valve starts, the upper and lower membrane valve gates may switch on or off simultaneously, to reduce delay phenomena generated during the operation, and effectively abbreviate the mechanism movement time, and firm the valve gate to switch on or off.

7 Claims, 6 Drawing Sheets

STRUCTURAL IMPROVEMENT OF MEMBRANE VALVE

BACKGROUND

1. Field of the Invention

The invention relates to a structural improvement of a membrane valve, especially, it relates to a kind of improved structure which may function with quickly responding, firmly switching on or off, mechanical movement responding rapidly, upper and under membrane moving simultaneously.

BACKGROUND

2. Description of the Prior Arts

In the course of industrial manufacture and garbage incineration, it is greatly important to filter completely the exhaust. Generally the exhaust is necessarily processed by dust-collecting treatment before being exhausted. The said dust-collecting device comprises a plurality of gantries sleeved by filtering bags, through which the particulate matter is eliminated when exhaust is deflated and filtered. In order to avoid accumulating plethoric dust on the surface of the device, which will lead to ventilating difficulties and the further failed function of filtering and clarifying, the prior technology adopt a plurality of membrane valve controlling the suppressed gas to be infused fiercely into the filtering bags the instant that valve gates is open under the automatically controlling method, as a result the dust is compelled to inversely depart from the surface of the bags, then is collected and transferred outside through the lower scrap tundish.

In pursuit of economization of the energy source and achievement of excellent eliminating effect, the adoptive air pressure is extremely high, meanwhile, the membrane valve must be operated within a spilt second. Approximately, the general conduction time is within several tenths of second. To control the movement of valves in a small scale will not induce a serious problem. However, when the controlled valve body is connected with a bigger duct, the method of multilayer interlock control with difference pressure is necessarily adopted. As shown in drawings, a valve body comprises two chambers with different sizes inside, interior of which is respectively arranged two shiver membranes of different scales, formed with flexibility. Furthermore a rigid valve gate is set in the centre of the membrane to plug the lower air duct. A couple of ingress perforations is arranged around the peripheral portion of the membrane, which enable the gas to be directed along the duct repeatedly infuse into the two chambers respectively and the interlock control to be realized. When the top magnetic valve is close up, the interior air pressure facilitates the two valve gates make a interlock move whereat close up. While the magnetic valve is unclosed, gas is exhausted off causing the valves turn open accordingly.

As far as the multilayer membrane valve according with the prior technology is concerned, due to its structure design of the inflating control means of valve gate switch, gas is inflated into the big chamber through the perforations on the big membrane, then infused into the small chamber through the perforations on the small membrane (or the perforations directly is arranged on the cover body as the dashed line shown in the drawings). Hereby it is inevitable that the upper small valve gate opens firstly before the lower big valve gate make an interlock move to closes up, which consequently bring on a delay on movement time. Accordingly, it is failed to realize instant responding. Besides, since the relationship of the two membranes is interlocked, even if a little flaw is found in the perforation of the upper membrane, the leak can affected the other membrane to move following it.

Therefore, to overcome this disadvantage the inventor made a deep research and improvement, took repetitious experiments and modification, finally developed the present invention.

The present invention is mainly intended to provide a kind of structural improvement of membrane valve characterized as quickly responding, firmly open and close up, mechanical operation responding rapidly, and able to make a simultaneous movement with the upper and lower membrane without causing interlock delay.

SUMMARY OF THE INVENTION

To achieve the object as described above, there is provided an improved structure of membrane valve in presented invention, the improved membrane valve mechanism including at least two layers of chambers which is configured in the valve body, and at the interior of each said chamber a duct is mounted, out of which covered with the bigger air coupling. Meantime, a membrane is arranged to separate the chamber from the duct, furthermore, the membrane acts as a valve gate controlling the communication between the duct and the air coupling, in which, a connection air tube is configured at the air couplings directly between the upper chamber and the lower chamber. The upper membrane is entirely sealed, accordingly, when the magnetic valve starts up control, the upper and lower membrane valve gates may switch on or off simultaneously, in result reduce delay phenomena generated during the usual operation, which in turn effectively abbreviate the mechanism movement time, and firm the valve to switch on or off, decrease the chance of erroneous movement resulted from the membrane flaws.

The structure and other characters may be perspicuous after peruse the follow description of examples combined with the drawings.

DETAILED DESCRIPTION OF THE DRAWINGS

Referring to FIG. 2 and FIG. 6 of the drawings, the present invention provided a kind of improved structure of membrane valve, which includes at least two embodiments of different patterns, except for the shell body 12 there is nothing else different.

As illustrated in FIG. 2 to FIG. 5 of the drawings, the main valve body 1 is made up of at least two layers of chamber 21 and chamber 22, each of chamber 21, 22 is connected to a duct 31, 32 respectively and is covered by the bigger air coupling 41, 42. A membrane 51 is arranged between the chamber 21 and duct 31 to depart them from each other, and that a membrane 52 is arranged between the chamber 22 and duct 32 to act as the same. The valve gate 55, 56 formed on the membrane 51, 52 control the communication between duct 31, 33 and air coupling 41, 42 respectively.

A connection air tube 6 is arranged in the valve wall between the upper chamber 21 and the under air coupling 42, in which the upper membrane 51 is in entirely sealed state, under this condition, when the magnetic valve 7 arranged on the upper chamber 21 is opened, the upper and lower membrane valve gate 55, 56 can switch on or off at the same time, which consequently reduce the delay phenomena generated during the usual operation, and effectively abbreviate the mechanism movement time, besides, firm the valve gate 55, 56 to be switched on or off, decrease the chance of erroneous movement resulted from flaws in the membrane 51.

As illustrated in FIG. 2 of drawings, the detailed design of the valve body 1 comprises a pair of up and under shell body 11, 12 on the top of which a magnetic valve cover 71 is arranged, moreover, around the peripheral portion of which a couple of partition lock holes 81 is arranged to fix the bolt 91, in which with respect to the under shell body 12, a big air coupling 42 is defined under which, meanwhile, in the centre of which a couple of partition rib 421 communicating with a small duct 32 is arranged. Furthermore, a venthole 121 formed in a "⌐" pattern is received in the inner wall of the coupling 42, with respect to the upper shell body 11, which is shaped like a plate cover, the upper shell body 11 provides the lower chamber 22, in the centre of which a air coupling 41 of a small scale is arranged. Around the convex peripheral portion of the chamber 41 defined lock hole 82, on the top of which a bolt 92 is arranged to interlock the magnetic valve cover 71, in which a partition rib 411 coupling to a smaller duct 31 is received in the opening thereon. A air tube 6 is supported on the radius plan of the upper shell body 11 with its inlet 61 arranged at the coupling point of venthole 121 of the under shell body 12, formed in the "⌐" pattern. On the other hand, the outlet 62 formed in a "L" shape and arranged at the convex wall of the central air coupling 41. When it is implemented the connected air tube 6 can be extend to another tube (not shown in drawings).

Under the magnetic valve cover 71 there is arranged a concave container providing said upper chamber 21, in which a "⌐" shaped perforation 72, received in the chamber cover wall, is communicated with the outlet 62 formed in a "L" shape; and opposed modular lock holes 5 is arranged on the big and small membrane 51, 52, furthermore, a hole 59, 58 is also arranged thereon so as to interconnect the upper shell body 11, the under shell body 12 and magnetic valve cover 71 after they are coupled together, in which the two membranes 51, 52 is flexible, meanwhile, opposed the duct 31, 32, at the central portion of the two membranes two rigid valve gates 55, 56 are formed. On the top of which respectively support spring 98, 99 pressing thereon, in which, the upper membrane 51 is entirely sealed, and the peripheral portion of the lower membrane valve gate 56 is arranged a couple of air perforation 57.

Referring to FIG. 4, FIG. 5 of the drawings, during combining the valve body 1 can be amounted a breast wall 10 at the outside of its bottom, when the magnetic valve 7 is opened or closed, the air from outside may pour into and store in its inter upper and lower chamber 21, 22 providing a air pressure which compel the centre of the upper and lower membrane 51, 52 to swell downwards and drive the valve gate 55, 56 block up the duct 31, 32. At the same time the magnetic valve 7 is opened, the interlocked tube 6 make the inter pressure of the chamber 21, 22 be set off, accordingly membrane 51, 52 restored promptly, and the two party make the coinstantaneous movement. Finally they cause the gas injected from the lower air coupling 42 can be discharged through the duct 32, which is then be used to eliminate the particulate matter (not shown in drawings).

As described above, the membrane valve provided in present invention safely accelerate the mechanistic responding rate, overcome the disadvantage of delaying in generally use, firm the valve gate to be switched on or off, achieve the object of saving energy source by instant switch, and decrease the erroneous movement caused by the upper membrane flaws. Its function suppress the prior technology, has progressive and applied value.

It will be appreciated by persons skilled in the art that numerous variations and/or modifications may be made to the invention as shown in the specific embodiments without departing from the spirit or scope of the invention as broadly described.

BRIEF DESCRIPTION OF THE DRAWINGS

The invention is now described by way of example with reference to the accompanying drawings in which.

Figure 1:
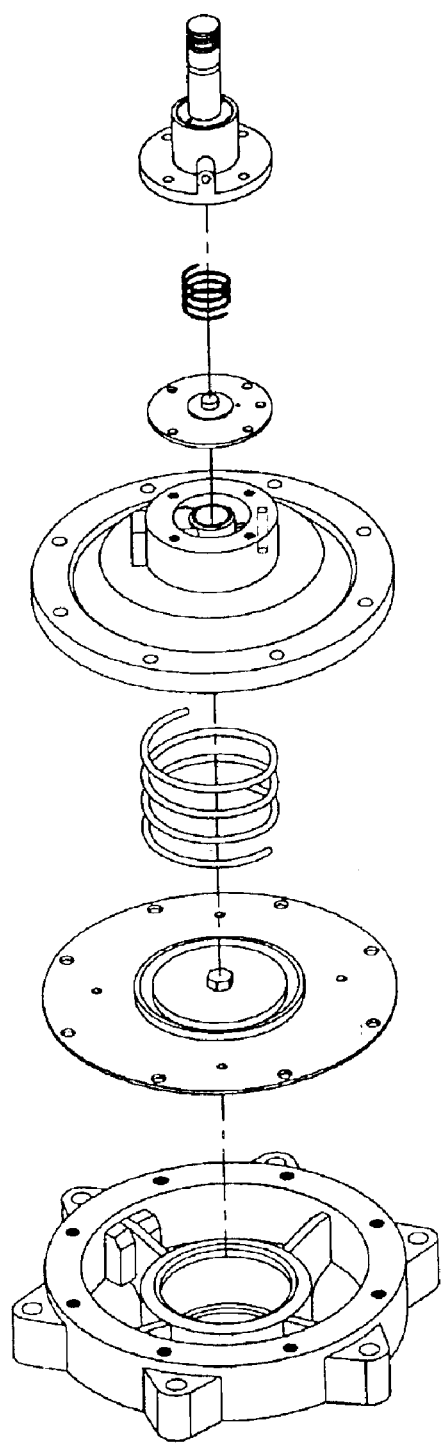
FIG. 1 shows a three dimensional, exploded view of valve body portion in accordance with the prior technology.
Figure 2:
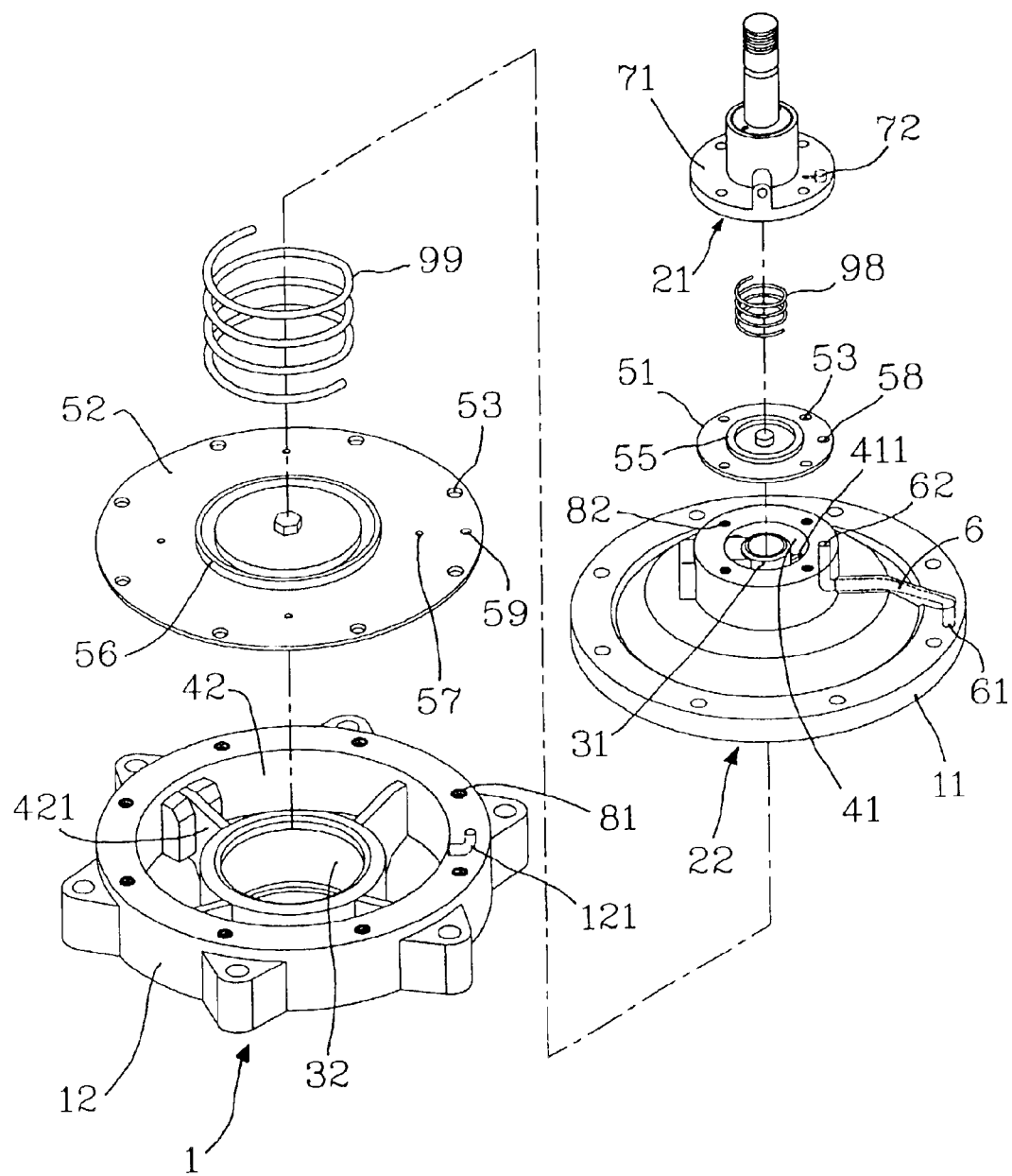
FIG. 2 shows a three dimensional, exploded view of valve body structure in accordance with the invention.
Figure 3:
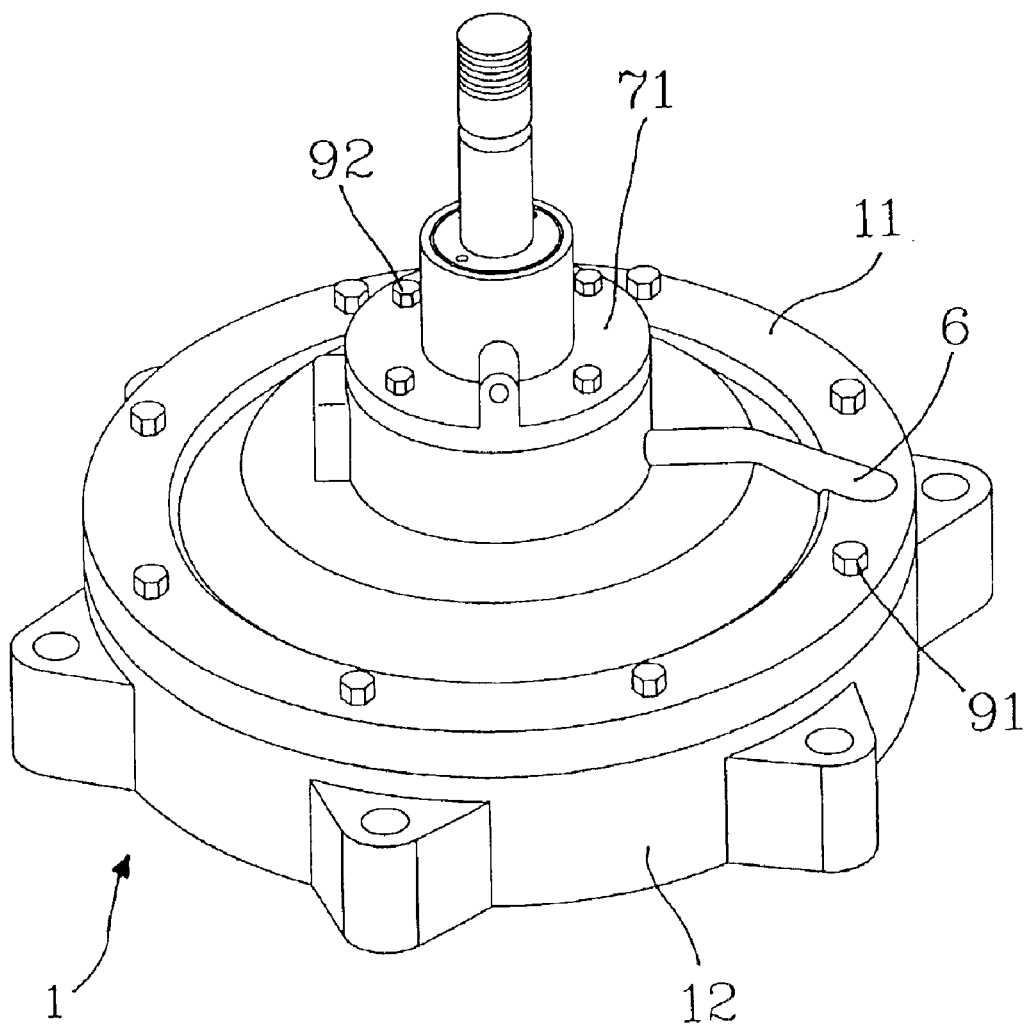
FIG. 3 shows a three dimensional, assembled view of valve body structure in accordance with the invention.
Figure 4:
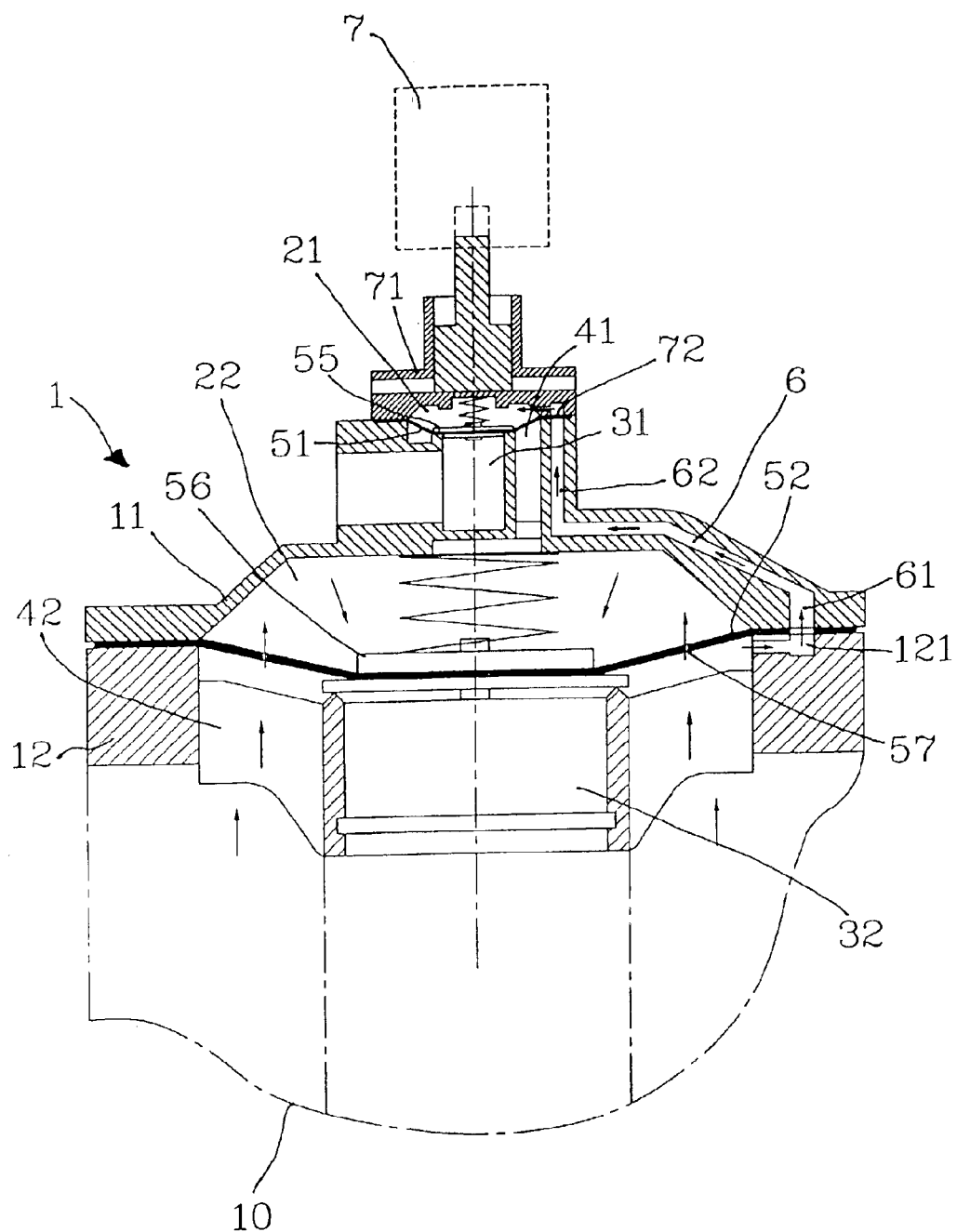
FIG. 4 shows an view of the operation of the valve gate locked, in accordance with the invention.
Figure 5:
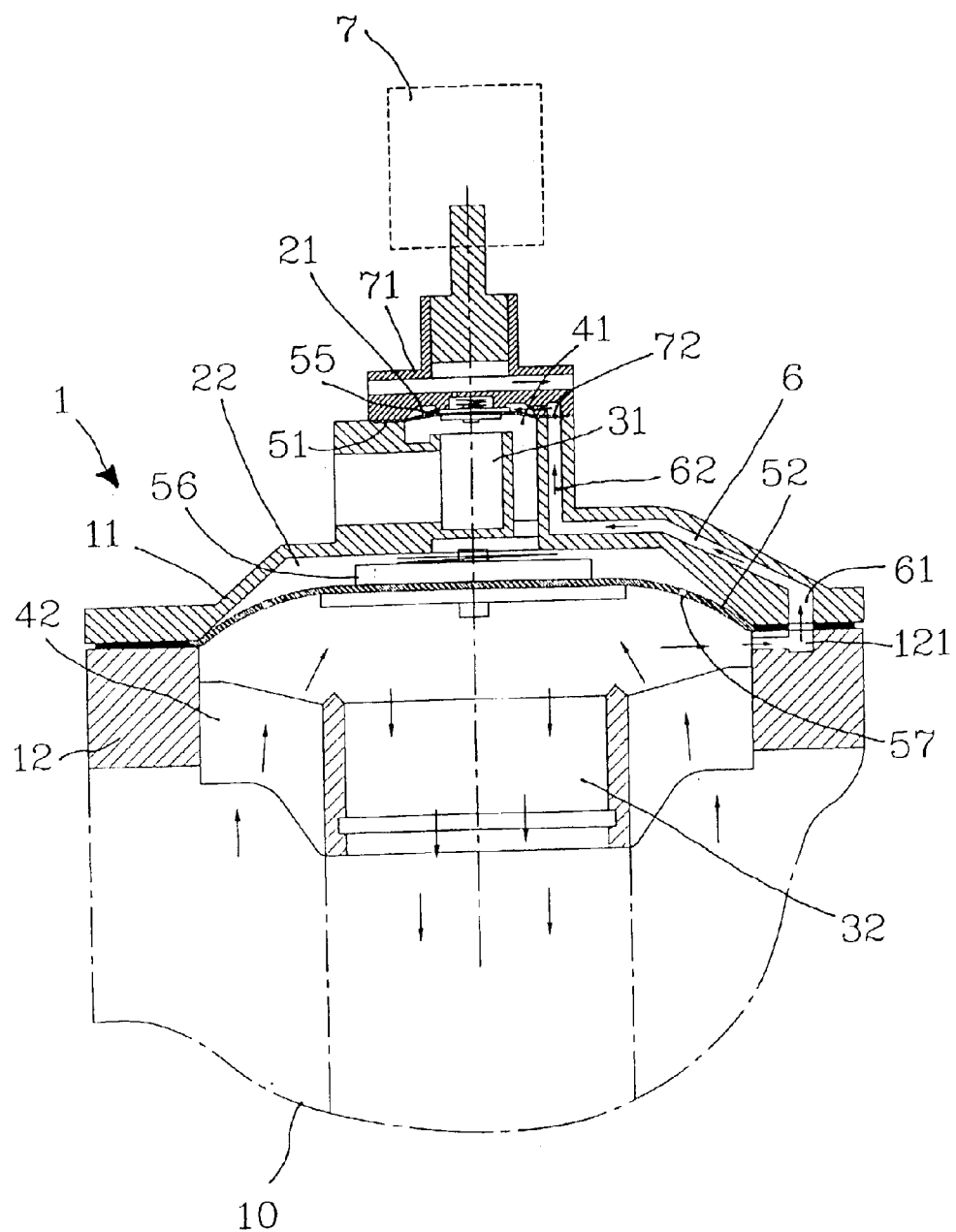
FIG. 5 shows an view of the operation of the valve gate opened in accordance with the invention.
Figure 6:
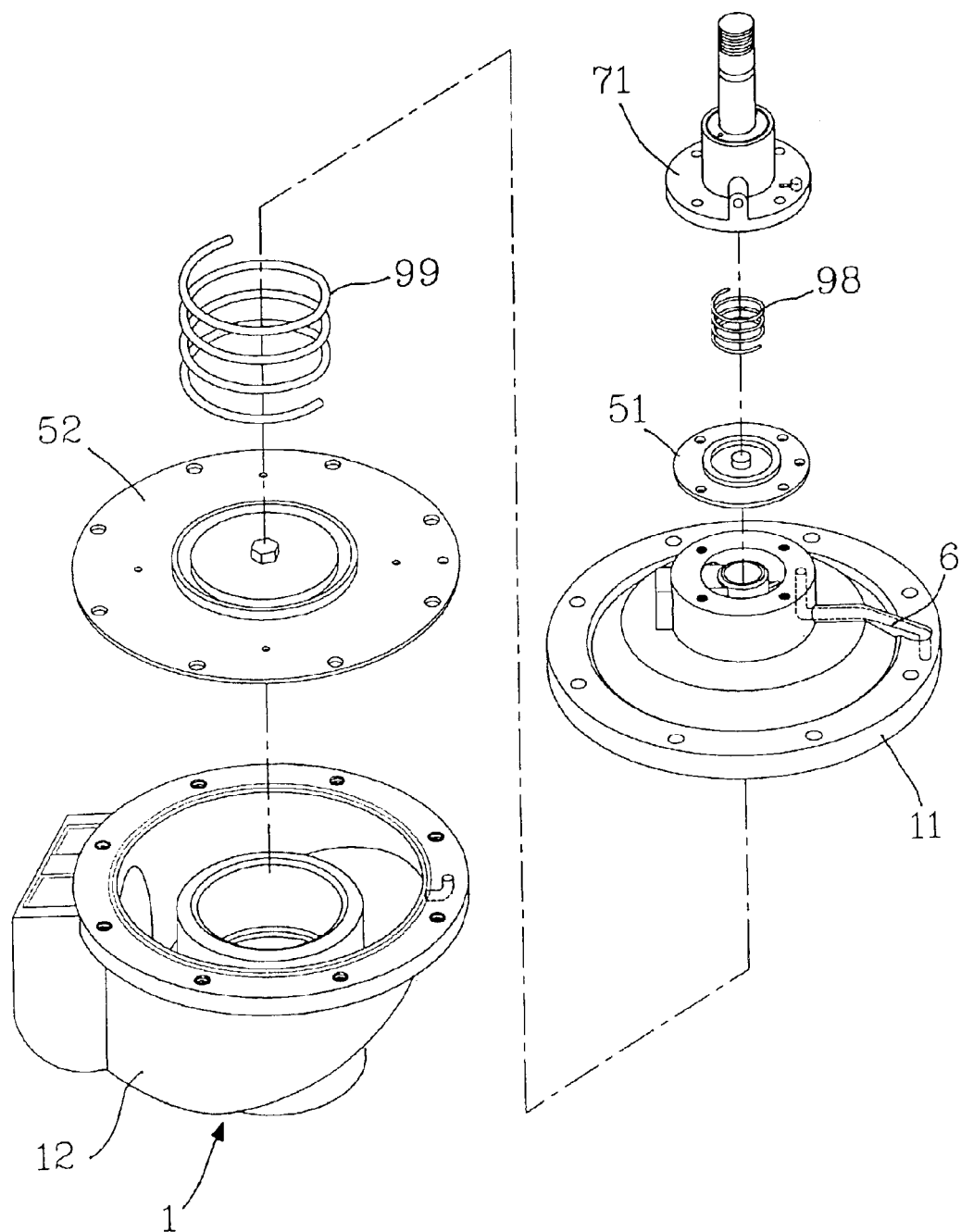
FIG. 6 shows a three dimensional, exploded view of a valve body structure, in accordance with another embodiment of the invention.

I claim:

1. A membrane valve mechanism comprising:
   a) a main valve body having an upper shell body, a lower shell body connected to a bottom of the upper shell body, and a valve cover connected to a top of the upper shell body;
   b) the valve cover having a magnetic valve located on a top thereof and movable between open and closed positions, and an upper chamber located on a bottom thereof;
   c) the upper shell body having:
      i) an upper duct located in a middle section of a top thereof and positioned adjacent to the upper chamber;
      ii) an upper air coupling located on an exterior of and communicating with the upper duct; and
      iii) an lower chamber located on a bottom thereof;
   d) the lower shell body having:
      i) an lower duct located through a middle section thereof and positioned adjacent to the lower chamber; and
      ii) an lower air coupling located on an exterior of and communicating with the lower duct;
   e) an upper membrane located between the upper chamber and the upper duct and having an upper valve gate selectively sealing the upper duct, the upper membrane controlling a communication between the upper air coupling and the upper duct;
   f) a lower membrane located between the lower chamber and the lower duct and having a lower valve gate selectively sealing the lower duct, the lower membrane controlling a communication between the lower air coupling and the lower duct; and
   g) an air tube located in outer peripheral walls of the main valve body, the air tube having a first end communicating with the upper chamber and a lower end communicating with the lower air coupling, wherein the upper chamber axially aligning with each of the upper duct, the lower chamber, and the lower duct.

2. The membrane valve mechanism according to claim 1, wherein the upper chamber is sealed from the upper duct by the upper membrane.

3. The membrane valve mechanism according to claim 1, wherein the air tube includes a perforation located through an outer peripheral wall of the valve cover, a connection air tube located in an outer peripheral wall of the upper shell body, and a lower vent hole located in an outer peripheral wall of the lower shell body.

4. The membrane valve mechanism according to claim 3, wherein the connection air tube includes an extended tube body.

5. The membrane valve mechanism according to claim 1, further comprising two springs, one of the two springs is connected to a top of each of the upper valve gate and the lower valve gate.

6. The membrane valve mechanism according to claim 1, wherein the upper shell body has at least one partition rib connected to the upper duct, and the lower shell body has a plurality of partition ribs connected to the lower duct.

7. The membrane valve mechanism according to claim 1, wherein the lower membrane has a plurality of air perforations communicating with the lower chamber and the lower duct.

\* \* \* \* \*